US012591733B1

(12) United States Patent
Mortensen et al.

(10) Patent No.: US 12,591,733 B1
(45) Date of Patent: Mar. 31, 2026

(54) SYSTEMS AND METHODS FOR DIGITALLY INTERPRETING A LINGUISTIC SECTION OF A SOURCE FILE VIA HIGHLIGHTING ON A GRAPHICAL USER INTERFACE

(71) Applicant: Veeva Systems Inc., Pleasanton, CA (US)

(72) Inventors: Marius K. Mortensen, Burlington (CA); Seth Winslow, Indianapolis, IN (US); Anthea Jing Lai, Richmond Hill (CA)

(73) Assignee: Veeva Systems Inc., Pleasanton, CA (US)

( * ) Notice: Subject to any disclaimer, the term of this patent is extended or adjusted under 35 U.S.C. 154(b) by 0 days.

(21) Appl. No.: 19/098,492

(22) Filed: Apr. 2, 2025

(51) Int. Cl.
  *G06F 17/00* (2019.01)
  *G06F 40/109* (2020.01)
  *G06F 40/58* (2020.01)

(52) U.S. Cl.
  CPC ............ *G06F 40/109* (2020.01); *G06F 40/58* (2020.01)

(58) Field of Classification Search
  CPC .............................. G06F 40/109; G06F 40/58
  See application file for complete search history.

(56) References Cited

U.S. PATENT DOCUMENTS

| | | | | | |
|---|---|---|---|---|---|
| 9,633,653 | B1 * | 4/2017 | Porter | ................... | G10L 15/063 |
| 10,282,422 | B2 * | 5/2019 | Sripada | ................... | G06F 16/31 |

| | | | | | |
|---|---|---|---|---|---|
| 10,360,301 | B2 * | 7/2019 | Allen | ................... | G06F 40/216 |
| 10,860,812 | B2 * | 12/2020 | Sripada | ................... | G06F 40/56 |
| 11,386,890 | B1 * | 7/2022 | Fan | ................... | G06F 40/30 |
| 11,538,560 | B2 * | 12/2022 | Kohli | ................... | G06F 40/40 |
| 11,748,577 | B1 * | 9/2023 | Aberle | ................... | G06N 20/00 704/9 |
| 12,271,446 | B1 * | 4/2025 | Walsh | ................... | G06N 3/047 |
| 12,314,680 | B1 * | 5/2025 | Roll | ................... | G06F 40/58 |
| 2011/0231181 | A1 * | 9/2011 | Furuuchi | ................ | G06F 40/58 704/7 |
| 2015/0287408 | A1 * | 10/2015 | Svendsen | ................ | G10L 15/26 704/235 |
| 2018/0137432 | A1 * | 5/2018 | Chen | ................... | G06N 3/0442 |
| 2019/0103111 | A1 * | 4/2019 | Tiwari | ................ | G06F 16/3329 |
| 2021/0390958 | A1 * | 12/2021 | Won | ................... | G06F 40/106 |
| 2023/0046851 | A1 * | 2/2023 | Ogura | ................... | G06F 40/30 |

(Continued)

FOREIGN PATENT DOCUMENTS

| | | | | | | |
|---|---|---|---|---|---|---|
| CN | 116187324 | A | * | 5/2023 | ........... | G06F 40/289 |
| CN | 117203676 | A | * | 12/2023 | ............ | G06T 19/20 |

(Continued)

*Primary Examiner* — Laurie A Ries

(57) ABSTRACT

A method for digitally interpreting a linguistic section of a source file to generate a case dataset includes generating text data based on the linguistic section. The text data is in a first language. The method further includes translating the text data from the first language to a second language. The method further includes determining a first portion of the text data includes a medical product identifier. The method further includes outputting the text data to a client computing device to enable display on a user interface. The user interface includes a document viewer section including the text data. A portion of the text data including an adverse event term includes a second indication in response to the document viewer section receiving a selection of the second portion.

20 Claims, 8 Drawing Sheets

(56) References Cited

U.S. PATENT DOCUMENTS

| | | | |
|---|---|---|---|
| 2025/0045458 A1 * | 2/2025 | Aravamudan | G16H 10/60 |
| 2025/0061990 A1 * | 2/2025 | Experton | G06F 21/6245 |
| 2025/0165717 A1 * | 5/2025 | Burton | G06T 11/206 |
| 2025/0166601 A1 * | 5/2025 | Min | G10L 13/033 |

FOREIGN PATENT DOCUMENTS

| | | | | | |
|---|---|---|---|---|---|
| CN | 117909883 A | * | 4/2024 | | G10L 25/63 |
| CN | 119538947 A | * | 2/2025 | | G06F 18/214 |
| WO | WO-2011076961 A1 | * | 6/2011 | | G06F 16/951 |
| WO | WO-2021034666 A1 | * | 2/2021 | | G06F 16/3329 |
| WO | WO-2022272147 A9 | * | 4/2023 | | G10L 15/26 |
| WO | WO-2024044088 A1 | * | 2/2024 | | G06N 20/00 |

* cited by examiner

200

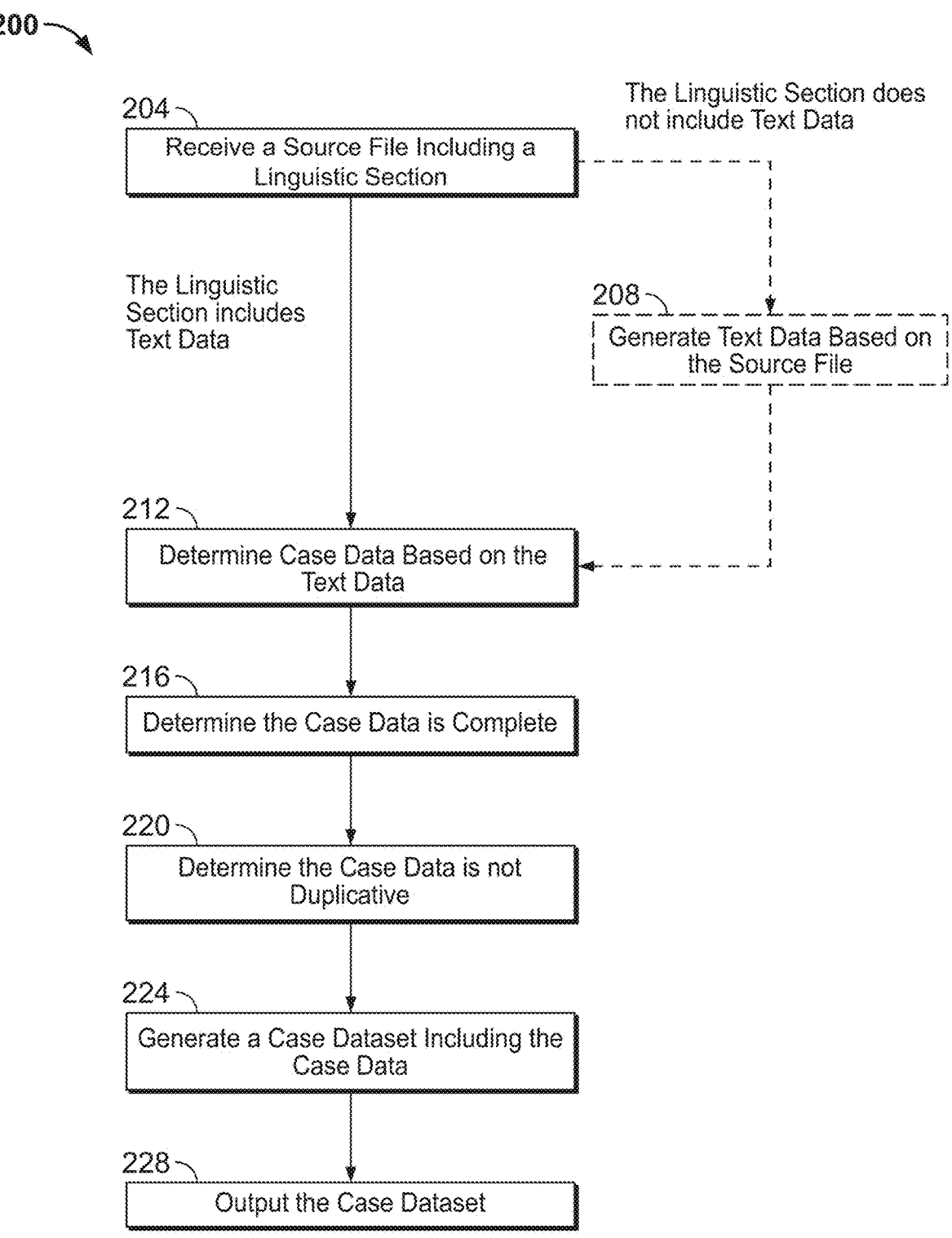

204

Receive a Source File Including a
Linguistic Section

The Linguistic Section does
not include Text Data

The Linguistic
Section includes
Text Data

208

Generate Text Data Based on
the Source File

212

Determine Case Data Based on the
Text Data

216

Determine the Case Data is Complete

220

Determine the Case Data is not
Duplicative

224

Generate a Case Dataset Including the
Case Data

228

Output the Case Dataset

SYSTEMS AND METHODS FOR DIGITALLY INTERPRETING A LINGUISTIC SECTION OF A SOURCE FILE VIA HIGHLIGHTING ON A GRAPHICAL USER INTERFACE

TECHNICAL FIELD

The present disclosure relates to systems and methods for digitally interpreting a linguistic section of a source file via highlighting on a graphical user interface.

BACKGROUND

Researchers, scientists, industry players, academics, government regulators, and other stakeholders are increasingly in need of efficient and simple ways to interpret and structure linguistic data.

SUMMARY

One embodiment relates to a method for digitally interpreting a linguistic section of a source file to generate a case dataset. The method includes receiving the source file including the linguistic section. The method further includes generating text data based on the linguistic section. The text data is in a first language. The method further includes translating the text data from the first language to a second language. The method further selecting a medical product identifier from a first repository. The method further includes determining a first portion of the text data includes the medical product identifier. The method further includes outputting the text data to a client computing device to enable display on a user interface. The user interface includes a document viewer section including the text data. The first portion of the text data including the medical product identifier includes a first indication. A second portion of the text data including an adverse event term includes a second indication in response to the document viewer section receiving a selection of the second portion. The user interface further includes a case data panel including a medical product section and an adverse event section. The medical product section includes a medical product field including the medical product identifier. The adverse event section includes an adverse event field including the adverse event term in response to the document viewer receiving the selection of the second portion. The method further includes determining case data including the medical product identifier and the adverse event term. The method further includes generating the case dataset including the case data and outputting the case dataset.

Another embodiment relates to a provider computing system for digitally interpreting a linguistic section of a source file to generate a case dataset. The provider computing system includes a first repository, a second repository, a network interface, and a processing circuit including a processor and a memory. The first repository stores or more case datasets. The second repository stores adverse event terms. The network interface is configured to facilitate data communications via a network. The processing circuit is configured to: receive, via the network interface, the source file including the linguistic section; generate text data in a first language based on the linguistic section; translate the text data from the first language to a second language; select an adverse event term from the second repository; determine a first portion of the text data includes the adverse event term; and output, via the network interface, the text data to a client computing device to enable display on a user interface. The user interface includes a document viewer section including the text data and a first comment including the adverse event term and a username associated with the provider computing system. The first portion of the text data of the document viewer section includes a first indication. The user interface further includes a case data panel including an adverse event section. The adverse event section includes an adverse event field including the adverse event term. The processing circuit is further configured to: determine case data including the adverse event term; generate the case dataset including the case data; and output, via the network interface, the case dataset.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

FIG. 2 may be a flow diagram of a method for digitally interpreting a linguistic section of a source file via highlighting on a graphical user interface, according to an example embodiment.

FIG. 5 may be an illustration of some aspects of a user interface generated by the digital data interpretation and processing system of FIG. 1 to perform a duplicate data check, according to an example embodiment.

DETAILED DESCRIPTION

Figure 1:
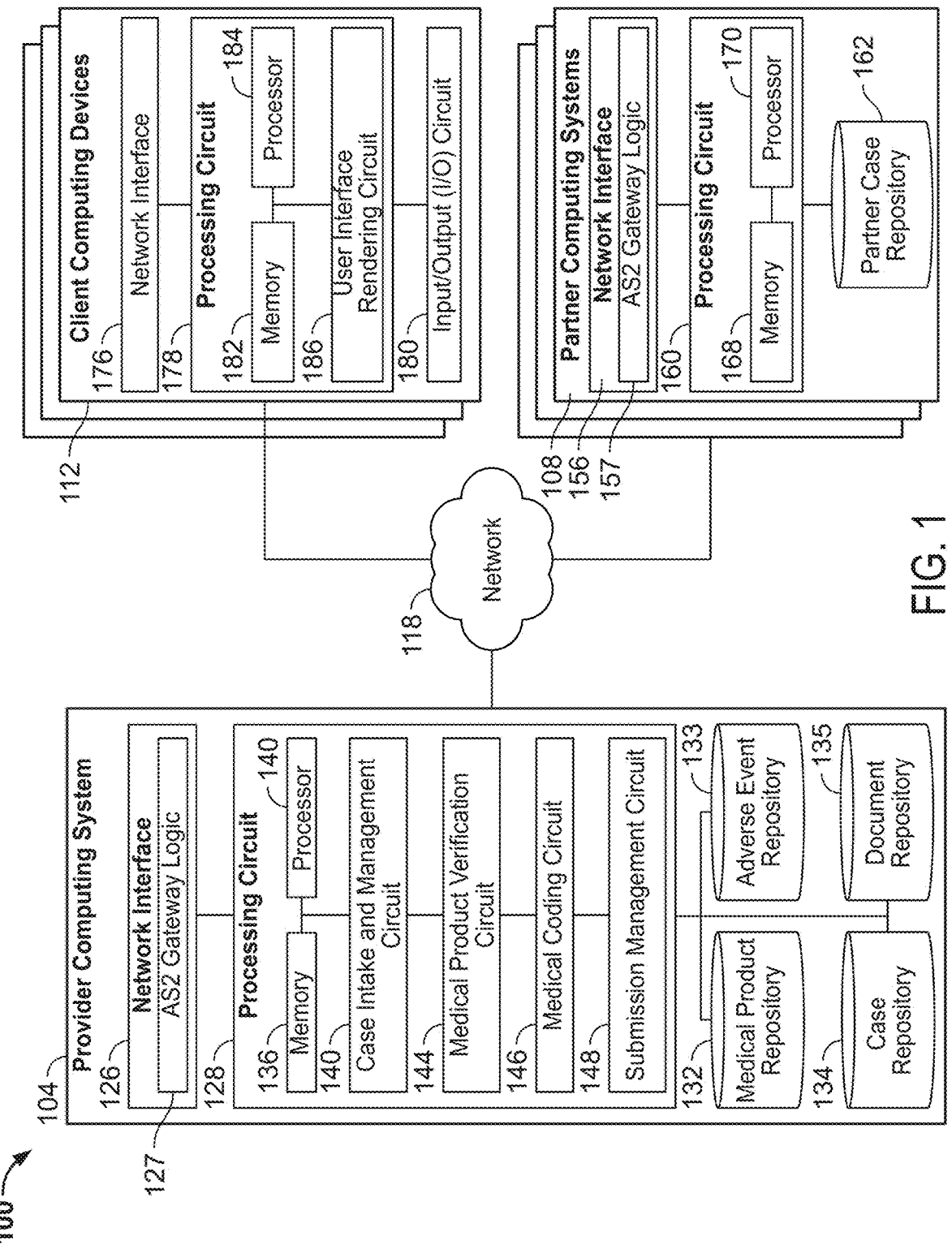
FIG. 1 may be component diagram of a digital data interpretation and processing system, according to an example embodiment.

Referring generally to the figures, systems and methods digitally interpreting a linguistic section of a source file are disclosed. The systems and methods described herein provide for simpler and faster adverse event processing, medical product coding, and case dataset generation, and thereby help and improve the pharmacovigilance industry by more accurately and more quickly tracking, capturing, and reporting adverse events. For example, by utilizing a text highlighter on a user interface for the intake of unstructured text data, the present systems can speed up adverse event intake and processing and bypass the slow process of manually reading through the source file and parsing the important information out, thereby shortening the time it takes for adverse events to be processed, case datasets to be generated and reported to the relevant health authorities. For instance, because the present systems and methods receive selections of portions of the text data (e.g., highlights) to then assign the portions of the text data as specific sections of the case data, the present systems and methods provide for an easier and faster methodology for the intake and processing of unstructured text data.

Additionally, because the systems and methods described herein remove time-consuming and laborious manual readthroughs of unstructured text data case data and then clean the selected text data, the present systems provide for more accurate, less error-prone case data, which allows for quicker and more efficient case dataset generation and reporting. For instance, in typical systems, a user may have to read through unstructured text data and manually add each portion of the case data to the system. This is time-consuming and error prone as the user has to manually type in each value. In comparison, the present systems and methods provide an improved user interface in which the user can read through the text data and simply highlight portions that match case data. Then, the present systems and methods may clean the selected text data (e.g., transform date formats, remove erroneous letters, etc.) and generate the case dataset including the selected case data. By doing so, the present systems and methods provide for more accurate, less error-prone case data, which allows for quicker and more efficient case dataset generation and reporting, and prevents data from being rejected for being incorrectly entered.

Additionally, the systems and methods described herein provide for improved case duplication detection, and thereby help and improve the pharmacovigilance industry by more accurately tracking, capturing, and preventing the reporting of duplicate cases. For example, by automatically searching for and determining/selecting potential duplicate cases in response to receiving a request to generate a case, the present systems detect duplicate cases at a convenient time for the user (e.g., when they are in the process of generating the case), thereby providing an automatic check on duplicate cases that is not available in typical case processing and generation systems. Further, because the systems and methods described herein display the potential duplicate cases on a user interface directly after receiving the request to generate the case and in response to determining the potential duplicate cases, the present systems provide the user with an additional overview and inspection of the current case and potential duplicate cases that is not available in typical case processing and generation systems, which allows for quicker and more efficient duplicate case detection and management.

Likewise, because the present systems and methods rank the potential duplicate cases (e.g., as a first rank or as a second rank) based on the match between the case to be generated and the respective duplicate case and then arrange the potential duplicate cases on the user interface based on the rank, the present systems provide the user with an improved overview of the potential duplicate cases. Further, because the present and systems and methods then analyze and compare (e.g., via visual indications (e.g., colors, shapes, etc.)) a selected potential duplicate case and the case to be generated on a field-by-field and in a line-by-line manner, the present systems and methods further provide an easy-to-comprehend comparison and analysis of the differences and similarities between the case to be generated and the selected potential duplicate case, which allows the user to quickly analyze the two cases and make a decision on whether the potential duplicate is a duplicate, is a related case, or is not a duplicate.

As used herein, the term "event," "medical event," or "adverse event" can include any untoward medical occurrence which happens to either a patient or a subject in a clinical investigation or during regular use of a medical product that has been given to that person. For example, the "event," "medical event," or "adverse event" may encompass any signs which are unfavorable and unexpected to the patient or subject, including any abnormal laboratory findings such as a high blood pressure, a rapid heart rate, etc. The "event," "medical event," or "adverse event" could be symptoms, or a disease temporally associated with the use of a medical product and does not have to have been previously associated with that product. The term "event," "medical event," or "adverse event" can further encompass adverse reactions and serious adverse events such as death, life-threatening adverse experiences, inpatient hospitalization, congenital birth defects, disabilities, etc. Further, each "event," "medical event," or "adverse event" may be defined by the Medical Dictionary for Regulatory Activities (MedDRA) (or other medical code dictionaries) and associated with a specific MedDRA code. Moreover, "event information" "medical event information" "adverse event information" "event data" "medical event data" or "adverse event data" can include information associated with the event such as the date of onset of the event, the date of cessation of the event, the type of event, the dictionary (i.e., digital dictionary, medical dictionary, digital medical dictionary, etc.) or medical term (e.g., MedDRA term), the dictionary or medical code (e.g., MedDRA code), event comments, the outcome of the event, the location of the event (e.g., country where the event occurred), the event duration, patient data for a patient who endured or to which the event occurred, medical products (and associated medical product data) or substances that the patient consumed and/or dosages for the consumed medical products, the event rank, event contacts, the event type, and any associated event documents.

As used herein, the term "case" or "case dataset" can include an Individual Case Safety Report (ICSR) as defined by the standard ISO/HL7 27953 of the International Standards Organization (ISO) as well as any past or future standards governing ICSRs of the ISO, the World Health Organization (WHO), the Food and Drug Administration (FDA), the European Medicines Agency (EMA), or other national health agencies governing ICSRs. Moreover, "case information" "case data" or "case dataset" can include information associated with or included in the case such as adverse event data, case contact data, case identifier (e.g., case worldwide ID (WWID), case number, etc.), case priority data, case seriousness data, case documents, medical product data (e.g., substances in the medical product, medical product registrations, medical product dosages, medical product name, etc.) patient data, and other data associated with a case as defined by the standard ISO/HL7 27953 as well as any past or future standards governing ICSRs of the ISO, the WHO, the FDA, the EMA, or other national health agencies governing ICSRs.

As used herein, the term "substance" can include a substance as defined by the FDA or the EMA. Further, the term "substance" can include an active ingredient or any component of a medical product that provides pharmacological activity or other direct effect in the diagnosis, cure, mitigation, treatment, or prevention of disease, or to affect the structure or any function of the body of man or animals. In this regard, the "substance" may be component responsible for the activity of a medical product.

Referring now to FIG. 1, a system 100 for arranging data on a user interface is shown, according to an example embodiment. The system 100 includes a provider computing system 104, multiple partner computing systems 108, and multiple client computing devices 112 connected by a secure network (e.g., a network 118).

The network 118 communicably and operably couples the provider computing system 104, the partner computing devices 108, and the client computing devices 112 such that communicable and operable computing may be provided between the provider computing system 104, the partner computing devices 108, and the client computing devices 112 over the network 118. In various embodiments, the network 118 includes any combination of a local area network (LAN), an intranet, the Internet, or any other suitable communications network, directly or through another interface.

The provider computing system 104 may be operated and managed by a provider (e.g., a software as a service (SaaS) provider, a cloud services provider, a software provider, a service provider, etc.) and may include a computer system (e.g., one or more servers (e.g., a cloud computing server) each with one or more processing circuits). In some embodiments, the provider computing system 104 may act as a host and provide an application (e.g., a web-based application, a mobile application, etc.) to the client computing devices 112 over the network 118 in response to authenticating the respective computing device 112. For example, the provider computing system 104 may receive authentication data (e.g., a username and corresponding password, a limited-use key, a two-factor authentication code or key, etc.) from one of the client computing devices 112. The provider computing system 104 may then authenticate the client computing device 112 based on the authentication data and provide an application to the client computing device 112 over the network 118. In some examples, the provider computing system 104 may be a multi-tenant system where various elements of hardware and software may be shared by one or more customers. In a multi-tenant system, a user is typically associated with a particular customer. In one example, a user (e.g., of the client computing device 112) could be an employee of one of a number of (pharmaceutical) companies which are tenants, or customers, of the provider computing system 104.

In some embodiments, the provider computing system 104 may run on a cloud computing platform. Users can access content on the cloud independently by using a virtual machine image or purchasing access to a service maintained by a cloud repository provider.

In some embodiments, the provider computing system 104 may be provided as Software as a Service ("SaaS") to allow users to access the provider computing system 104 with a thin client.

As shown, the provider computing system 104 may include a network interface 126, a processing circuit 128, a medical product repository 132, an adverse event repository 133, a case repository 134, and a document repository 135. In some embodiments, the provider computing system 104 may include an input/output circuit (e.g., similar to (e.g., the same as) an input/output circuit 162 as will described further herein).

The network interface 126 is structured to establish connections with the partner computing devices 108 and the client computing devices 112 by way of the network 118. The network interface 126 includes program logic (e.g., AS2 Gateway Logic 127) and/or hardware-based components that connect the provider computing system 104 to the network 118. For example, the network interface 126 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 126 includes the hardware and machine-readable media structured to support communication over multiple channels of data communication (e.g., wireless, Bluetooth, near-field communication (NFC). In some embodiments, the network interface 126 includes cryptography logic and capabilities to establish a secure communications session.

The AS2 gateway logic 127 includes programmable instructions that facilitate communication (transmission and receipt) using the Applicability Statement 2 (AS2) communication protocol (as specified in Request for Comment (RFC) 4130) over the network 118 via the network interface circuit 126. For example, using the AS2 gateway logic 127, the network interface 126 may transmit or receive files (e.g., the source file, a case, etc.) or other data to the partner computing systems 108 or client computing devices 112 using the AS2 Gateway protocol. In other embodiments, the AS2 gateway logic 127 may transmit or receives files using the most updated Applicability Statement communication protocol (e.g., AS3, etc.).

The processing circuit 128, as shown, comprises a memory 136, a processor 140, a case intake and management circuit 142, a medical product verification circuit 144, a medical coding circuit 146, and a submission management circuit 148. The memory 136 includes one or more memory devices (e.g., RAM, NVRAM, ROM, flash memory, hard disk storage, etc.) that store data and/or computer code for facilitating the various processes described herein. That is, in operation and use, the memory 136 stores at least portions of instructions and data for execution by the processor 140 to control the processing circuit 128. The memory 136 may be or include tangible, non-transient volatile memory and/or non-volatile memory. The processor 140 may be implemented as a general-purpose processor, an application specific integrated circuit (ASIC), one or more field programmable gate array (FPGAs), a digital signal processor (DSP), a group of processing components or other suitable electronic processing components.

As described herein, the case intake and management circuit 142 is structured or configured to receive, generate, store, and manage case datasets. For instance, the case intake and management circuit 142 may be configured or structured to periodically receive or retrieve a source file including adverse event data associated with an adverse event from a trusted source (e.g., one of the partner case repositories 162). In some embodiments, the source file may include a linguistic section. In response to the linguistic file including text data, the case intake and management circuit 142 may determine case data based on the text data. In comparison, if the linguistic section does not include text data, the case intake and management circuit 142 may provide the source file to another circuit (not shown) and/or generate text data based on the source file. In some embodiments, the case intake and management circuit 142 may determine case data by matching the adverse event data with medical product data of the medical product repository 132 and/or adverse event terms and codes of the adverse event repository 133 to. In some embodiments, the case intake and management circuit 142 may provide the adverse event data to one of the client computing devices 112 for display on a user interface, as will be described further herein.

Once the case intake and management circuit 142 has determined case data, the case intake and management circuit 142 may generate a case dataset including case data, and store the case dataset within the case repository 134. In one example, the case intake and management circuit 142 may be an instance of Vault Safety®. In some embodiments, when generating the case dataset, the case intake and management circuit 142 may further search the case repository 134 for case datasets which may be a duplicate of the newly generated case. In other embodiments, the case intake and management circuit 142 may output (via the network interface circuit 126) one or more of the case datasets as a specific file type (e.g., E2B (R3) XML file, as a Council for International Organizations of Medical Sciences (CIOMS) II PDF file, etc.) to one or more of the partner computing systems 108 or the client computing devices 112. In other embodiments, the submission management circuit 148 outputs the case datasets and/or the digital documents described herein.

As described herein, the medical product verification circuit 144 is structured or configured to receive a medical product term and verify the medical product identified is the same as one of the customer's or user's medical products (e.g., stored in the medical product repository 132).

For example, a source file may be received that includes adverse event data. The adverse event data may include patient data, medical product data, a medical code, an adverse event code or term, and reporter data. For instance, the adverse event data may indicate a patient (e.g., Jane Doe) was hospitalized in the state of Montana for blindness (as indicated by the medical code for blindness) while or after taking 10 MG, orally, of a specific substance (e.g., substance Y) and treated by the reporter (e.g., Dr. Carlson with national provider identifier (NPI) 111111). As a result, medical product verification circuit 144 may search or query the medical product repository 132 for medical products that include the specific substance (e.g., substance Y) and return multiple matching medical products (e.g., medical products that include substance Y) and their medical product data. Then, the medical product verification circuit 144 may determine if any of the matching medical products can be verified or determined to be a substantially matching medical product based on the medical product data of the returned medical products, the one or more medical product verification preferences, and the adverse event data of the source file.

Additionally, in response to verifying/determining the specific medical product, the medical product verification circuit 144 may provide the medical product data of the verified medical product to the case intake and management circuit 142. In response, the case intake and management circuit 142 may generate a case dataset including the medical product data. In comparison, if the medical product of the source file is not verified (e.g., does not have a substantial match within the medical product repository 132), the medical product verification circuit 144 may generate a notification indicating as such and provide the notification to one of the client computing devices 112 (e.g., via email, via an internal message, via an icon on a user interface, etc.) for display thereon.

As described herein, the medical coding circuit 146 is structured or configured to receive an adverse event term and code the term to a specific regulated adverse event term (e.g., a Medical Dictionary of Regulatory Activities (MedDRA) term and/or code). For example, the provider computing system 104 may receive a source file including adverse event data. The adverse event data may identify a adverse event (e.g., headache). In response, the medical coding circuit 146 may receive the term and code the term to a specific MedDRA code and/or term by searching the adverse event repository 133 for a matching term.

Then, in response to verifying/determining the specific adverse event term and/or code, the medical coding circuit 146 may provide the adverse event term and/or code to the case intake and management circuit 142. In response, the case intake and management circuit 142 may generate a case dataset including the adverse event term and/or code.

The submission management circuit 148 is structured or configured to output or provide the generated case dataset to the one of the partner computing systems 108, in response to generating the case dataset. For instance, using the example above, the submission management circuit 148 may generate an electronic submission associated with the generated case dataset and output the case dataset (e.g., as an E2B (R2 or R3) XML file, as a CIOMS II PDF file, as an email, etc.) to the partner computing system 108 associated with the FDA (e.g., the FDA submissions gateway), in response to the case originating in the USA. In some embodiments, the submission management circuit 148 may output the case dataset using the AS2 communication protocol to the partner computing system 108. In other embodiments, other communication protocols (e.g., file transfer protocol (FTP), email, etc.) may be used to output or transmit the case dataset to the partner computing system 108.

Still referring to FIG. 1, the medical product repository 132 may be repository (e.g., a database) that is structured or configured to receive, store, and manage medical products and medical product data of users or customers. In this regard, the medical product repository 132 may receive, store, and manage medical products including medical product registrations. For example, a customer may have a medical product registered with the FDA (e.g., after applying for and receiving approval) and the EMA. The medical product registration with the FDA may include a medical product name, a list of substance(s) or active ingredient(s), a dosage or strength, a route of administration, a marketing status, and/or a national drug code (NDC) identifier. The medical product registration with the EMA may include the same but have a different identifier. Accordingly, one of the client computing devices 112 may provide medical product data including each piece of the FDA medical product registration and the EMA medical product registration to the provider computing system 104 for storage in the medical product repository 132. In that regard, the medical product repository 132 can be structured according to various database types, such as, relational, hierarchical, network, flat, point-in time, and/or object relational. Further, the medical product repository 132 may include a plurality of nonvolatile/non-transitory storage media such as solid-state storage media, hard disk storage media, virtual storage media, cloud-based storage drives, storage servers, and/or the like.

The adverse event repository 133 may be repository (e.g., a database) that is structured or configured to receive, store, and manage medical terms (e.g., medDRA terms) and associated codes (e.g., medDRA codes). For example, the adverse event repository 133 may be a medDRA term and code repository that includes each medDRA term and associated medDRA code of the MedDRA dictionary. In other embodiments, the adverse event repository 133 may receive and store terms and associated codes of other medical dictionaries or classification standards such as the World Health Organization (WHO) Drug Dictionary, the International Classification of Diseases (ICD), the International Classification of Functioning (ICF), the Interactional Classification of Health Interventions (ICHI), and the like. In other embodiments, the medical adverse event repository 133 may receive and store terms and associated codes of user-defined dictionaries (e.g., digital dictionaries received from the client computing device 108). To do so, the adverse event repository 133 can be structured according to various database types, such as, relational, hierarchical, network, flat, point-in time, and/or object relational. Further, the adverse event repository 133 may be configured to manage or maintain the integrity and/or version updates of the digitally-substantiated terms and codes such that the user or the administrator does not have to upkeep the medical terms as they change over time and/or new terms are added (e.g., as new MedDRA dictionaries are published).

In some embodiments, the adverse event repository 133 automatically provides the most current version of the digitally-substantiated terms and codes (e.g., the current version of the MedDRA terms and codes) to the medical coding circuit 146 and/or the user (e.g., of the client computing device 108). Further, the adverse event repository 133 may provide historical versions of the digitally-substantiated terms and codes when requested by the medical coding circuit 146 and/or the user. In some embodiments, the adverse event repository 133 may include term and/or code data objects associated with each term and/or code. For instance, the adverse event repository 133 may include a code data object associated with each term of the MedDRA dictionary. The code data object may include a reference (e.g., a link, a pointer, etc.) to the parent and/or child term of the code and version data. The version data may indicate the version of the MedDRA dictionary with which the code is associated (e.g., 32.0). In some embodiments, the adverse event repository 133 includes a plurality of nonvolatile/non-transitory storage media such as solid-state storage media, hard disk storage media, virtual storage media, cloud-based storage drives, storage servers, and/or the like.

Likewise, the case repository 134 may be repository (e.g., a database) that is structured or configured to receive, store, and manage case datasets and their respective data (e.g., case data, adverse event data, etc.). For example, the case repository 134 may receive case datasets and related case objects and store the case datasets therein. Then, in response to receiving a query or a request for one or more case datasets (e.g., a query for all cases that include a specific substance), the case repository 134 may provide and/or return the case datasets stored therein that match the query or request. For example, the case repository 134 may receive a query from the case intake and management circuit 1440 for all cases that include a specific criteria (e.g., a specific medical product, a specific country of origin, a specific date range). In response, the case repository 134 may determine each case dataset that includes the specific criteria stored therein and return each case dataset. Further, the case repository 134 can be structured according to various database types, such as, relational, hierarchical, network, flat, point-in time, and/or object relational. In some embodiments, the case repository 134 includes a plurality of nonvolatile/non-transitory storage media such as solid-state storage media, hard disk storage media, virtual storage media, cloud-based storage drives, storage servers, and/or the like.

The document repository 135 may be repository (e.g., a database) that is structured or configured to receive, store, and manage documents such as source documents (e.g., emails and email attachments). For example, the document repository 135 may receive a source document including a linguistic section and store the document therein. To do so, the document repository 135 can be structured according to various database types, such as, relational, hierarchical, network, flat, point-in time, and/or object relational. In some embodiments, the document repository 135 includes a plurality of nonvolatile/non-transitory storage media such as solid-state storage media, hard disk storage media, virtual storage media, cloud-based storage drives, storage servers, and/or the like.

While not shown, in some embodiments, the provider computing system 104 may include a separate repository for each data type described herein. For instance, the provider computing system 104 may include the case repository 134, the medical product repository 132, a reporter repository (not shown), a partner repository (for storing electronic addresses, communication protocols, and the like associated with partner computing systems 108) (not shown), a study repository (not shown), and the like.

Still referring to FIG. 1, the partner computing systems 108 may be managed by third-party partners (e.g., the FDA, the EHA, Health Canada, partner company 1, partner company 2, partner computing system xyz, etc.) and can be or include a computing device or system configured to communicate with the provider computing system 104 over the network 118. For instance, the partner computing systems 108 can be a server computer system, a gateway computing system, a laptop computer a desktop computer, and any other network-connected device that can communicate over the network 118. For example, one of the partner computing systems 108 may be the Electronics Submission Gateway (ESG) of the FDA through which one or more E2B XML files may be received from and/or provided to. In another example, one of the partner computing systems 108 may be a laptop computer operated by an employee of a partner company.

In operation, the partner computing systems 108 may communicate with the provider computing system 104 or the client computing device 112 to send and/or receive one or more electronic communications (e.g., case datasets, source files, etc.). For instance, a customer (e.g., pharma company 123) may submit case datasets to the FDA over the ESG of the FDA. Accordingly, the provider computing system 104 may provide case datasets to the first partner computing system 108 associated with the FDA. For instance, the provider computing system 104 (and more specifically the submission management circuit 148) may generate an outbound transmission including one or more case datasets. Then, the provider computing system 104 may output the outbound transmission to the first partner computing system 108.

As shown, each partner computing system 108 includes a network interface 156, a processing circuit 160, and a partner case repository 162. In some embodiments, each partner computing system 108 further includes a key repository (not shown) for storing AS2 keys and certificates.

The network interface 156 is structured to establish connections with the provider computing system 104 and/or the client computing device 112 by way of the network 118. The network interface 156 includes program logic (e.g., AS2 Gateway logic 157) and/or hardware-based components that connect each partner computing system 108 to the network 118. For example, the network interface 156 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 156 includes the hardware and machine-readable media structured to support communication over multiple channels of data communication (e.g., wireless, Bluetooth, near-field communication (NFC). In some embodiments, the network interface 156 includes cryptography logic and capabilities to establish a secure communications session.

The AS2 gateway logic 157 includes programmable instructions that facilitate communication (transmission and receipt) using the Applicability Statement 2 (AS2) communication protocol (as specified in Request for Comment (RFC) 4130) over the network 118 via the network interface circuit 156. For example, using the AS2 gateway logic 157, the network interface 156 may transmit or receive files (e.g., the source file, a case, etc.) or other data to the provider computing system 104 or client computing devices 112 using the AS2 Gateway protocol. In other embodiments, the AS2 gateway logic 127 may transmit or receives files using the most updated Applicability Statement communication protocol (e.g., AS3, etc.).

The processing circuit 160, as shown, comprises a memory 168 and processor 170. The memory 168 includes one or more memory devices (e.g., RAM, NVRAM, ROM, flash memory, hard disk storage, etc.) that store data and/or computer code for facilitating the various processes described herein. That is, in operation and use, the memory 168 stores at least portions of instructions and data for execution by the processor 170 to control the processing circuit 160. The memory 168 may be or include tangible, non-transient volatile memory and/or non-volatile memory. The processor 170 may be implemented as a general-purpose processor, an application specific integrated circuit (ASIC), one or more field programmable gate array (FP-GAs), a digital signal processor (DSP), a group of processing components or other suitable electronic processing components.

The partner case repository 162 may be similar or the same as the case repository 134 and is a repository (e.g., a database, cloud storage, etc.) that is structured or configured to receive, store, and manage case datasets associated with adverse events. For example, one of the partner computing systems 108 may receive a case dataset from the provider computing system 104 and store case dataset in the partner case repository 162. Further, the partner case repository 162 can be structured according to various database types, such as relational, hierarchical, network, flat, point-in time, and/or object relational. In some embodiments, the partner case repository 162 includes a plurality of nonvolatile/non-transitory storage media such as solid-state storage media, hard disk storage media, virtual storage media, cloud-based storage drives, storage servers, and/or the like.

Still referring to FIG. 1, the client computing devices 112 can each be any type of computing device or computing system. For instance, each client computing device 112 can be one or more of a mobile phone, a tablet computer, a laptop computer, a smart watch, a server computer system, or any other internet-connected device. In operation, the client computing devices 112 may communicate and interface with the provider computing system 104 via the network 118 to provide the medical product data for storage therein, medical product verification preferences, and source files. As shown, each client computing device 112 may include a network interface 156, a processing circuit 160, and the input/output (I/O) circuit 162.

The network interface 176 structured to establish connections with the provider computing system 104 by way of the network 118. The network interface 176 includes program logic and/or hardware-based components that connect the client computing device 112 to the network 118. For example, the network interface 176 may include any combination of a wireless network transceiver (e.g., a cellular modem, a broadband modem, a Bluetooth transceiver, a Wi-Fi transceiver, a Li-Fi transceiver, etc.) and/or a wired network transceiver (e.g., an Ethernet transceiver). In some embodiments, the network interface 176 includes the hardware and machine-readable media structured to support communication over multiple channels of data communication (e.g., wireless, Bluetooth, near-field communication (NFC). In some embodiments, the network interface 176 includes cryptography logic and capabilities to establish a secure communications session.

The processing circuit 176, as shown, comprises a memory 182, a processor 184, and a user interface generation or rendering circuit 186. The memory 182 includes one or more memory devices (e.g., RAM, NVRAM, ROM, flash memory, hard disk storage, etc.) that store data and/or computer code for facilitating the various processes described herein. That is, in operation and use, the memory 182 stores at least portions of instructions and data for execution by the processor 184 to control the processing circuit 176. The memory 182 may be or include tangible, non-transient volatile memory and/or non-volatile memory. The processor 184 may be implemented as a general-purpose processor, an application specific integrated circuit (ASIC), one or more field programmable gate array (FP-GAs), a digital signal processor (DSP), a group of processing components or other suitable electronic processing components.

The user interface rendering circuit 186 may be configured to receive a user interface (e.g., a web interface in an HTML file and related files, a downloaded graphical user interface, etc.) from the provider computing system 104 and render the user interface on the client computing device 112 via the I/O circuit 180. In this way, the provider computing system 104 may generate one or more user interfaces and provide the one or more user interfaces to the user interface generation circuit 186 to be rendered on the client computing device 112 (e.g., on a display of the I/O circuit 180 of the client computing device 186).

The I/O circuit 180 is structured to receive communications from and provide communications to the user of the client computing device 112 (e.g., the user). In this regard, the I/O circuit 180 is structured to exchange data with the processing circuit 178 to provide output to the user and to receive input from the user. As a result, the I/O circuit 180 may include a display that may be manipulated by the application. In some embodiments, the I/O circuit 180 may also include a keyboard, a mouse, a joystick, a touch screen, touch areas, soft keys, a microphone, a speaker, a vibration mechanism, a sensor, a RFID scanner, or other input/output devices described herein.

Referring now to FIG. 2, a method 200 of digitally interpreting a linguistic section of a source file via highlighting on a graphical user interface, according to an example embodiment. Method 200 can be carried out by the system of FIG. 1. More particularly, the method 200 can be carried out by the processing circuit 128 of the provider computing system 104 and through communication with the partner computing systems 108 and the client computing devices 112.

Method 200 commences at step 204 at which the provider computing system 104 receives a source file including at least one linguistic section (e.g., sections, such as paragraphs, including multiple words and terms). For example, a source file may be an email including a subject line (a first linguistic section), a body message (a second linguistic section), a sender email address, a recipient email address, and one or more attachments (possibly including additional linguistic sections). In another example, the source file may be at least one of a PDF file, a text file, a word processing file, a spreadsheet file (e.g., an excel file), a Comma-Separated Value (CSV) file, and the like. In some embodiments, the source file may be unstructured data that is not in a specific format.

The linguistic section(s) may include words and terms defining adverse event data (e.g., medical product data, reporter data, a seriousness, adverse event terms and/or codes, patient data, and the like). In one example, the provider computing system 104 may receive an email including a PDF attachment. The PDF attachment may be an adverse event report form including an adverse event that occurred, medical product(s) the patient was taking, the reporter's name and contact information, a study the patient was a part of, and the like. In some embodiments, the linguistic section may include text data. In other embodiments, the linguistic section may not include text data and may be an image or PDF file.

If the linguistic section(s) of the source file do not include text data, the provider computing system 104 may proceed to optional step 208 at which the provider computing system generates text data based on the source file (e.g., based on the linguistic sections of the source file). For instance, the provider computing system 104 may perform Optical character recognition (OCR), Regex, natural language processing (NLP), or other text recognition methods on the linguistic sections of the source file. In one example, the provider computing system 104 may use OCR to generate text data based on the linguistic sections and then add the text data to the source file. In another example, the provider computing system 104 may use OCR to generate text data based on the linguistic sections and then generate a text file including the text data therein.

In some embodiments, the text data may be generated in a first language. Then, at or after step 208, the provider computing system 104 may translate the text data from the first language to a second language. For instance, the source file may include a linguistic section which is in French. Accordingly, the text data may be generated in French and then translated to English.

If at step 204, the source file includes text data, the method 200 may proceed to step 212. Likewise, once the provider computing system 104 has generated the text data at step 208, the method 200 may proceed to step 212. At step 212, the provider computing system 104 may determine case data based on the text data. In some embodiments, determining case data may comprise two steps or portions: 1) determining, by the provider computing system 104, case data based on the text data and a case data schema, and 2) receiving one or more selections, via a user interface, of text data as being specific portions of the case data. In some embodiments, each step may be performed separately. For instance, the provider computing system 104 may determine case data based on the text data and a case data schema at a first time (e.g., at step 212), and then receive one or more selection of text data as being specific portions of the case data at a later step (e.g., after step 212).

The case data schema may identify the multiple types of data included in the case data (e.g., the medical product data, the adverse event term and/or code, the reporter data, the patient data, the study data, etc.) and define the mandatory portions of the case dataset. An example of the case data schema is shown below:

```
(case_number_v): {
    Case(case_version_v): {
    types: AER, Case, Imported Case;
    case_document_v: Object(Document);
    initial_case_v: Object(Case);
    case_identifier_v: Object(Case Identifier);
    case_organization_v: Object(Organization);
    primary_product_v: Object(Product);
    receipt_idate_v: DateTime;
    new_info_idate_v: DateTime;
```

-continued

```
    narrative_text_v; LongText;
    narrative_length_v; Number;
    modified_by_v; Object(User);
    report_type_v: Object(Controlled Vocabulary);
    case_study_registration_v: Object(Study Registration);
    event_country_v: Object(Country);
    case_contact_v: Object(Contact): {
        rank_v: Number;
        name_v: String;
        reporter_v: Bool;
        email_address_v: String;   }
    case_assessment_v: Object(Case Assessment): {
        case_product_v: Object(Product): {
            rank_v: Number;
            cumulative_dose_number_v: Number;
            primary_v: Bool;
            product_name_v: String;
            product_code_v: String;
            product_registration_v: Object(Product Registration);
            Registration_number_v: String;
            serial_number_v: String;
            Substances_v: Object(Substance);   }
        case_product_name_v: String;
        case_adverse_event_v: Object(Event): {
            event_country_v: Object(Country);
            event_meddra_v: Object(MedDRA event)
            event_meddra_pt_v: String;
            onset_idate_v: DateTime;
            rank_v: Number;
            seriousness_v: Picklist;
            expectedness_v: Bool;
            outcome_v: Object(outcome);      }}
    case_lifecycle_state_v: Object(Lifecycle State)
    age_value_v: Number;
    priority_value_v: Number;
    pregnancy_case_v: Bool;
    patient_first_name_v; String;
    patient_last_name_v: String;
    gender_value_v: String;
    height_value_v: Number;
    version_valu_v: Number;
    validity_v: Picklist   }
case_number_v: Number;
Case UID: String;
Organization: Object(Organization);
created_idate_v: DateTime;
created_by_v: Object(User);
Case WWUID: String; }
```

As shown, following the case data schema, the case data object may have or include multiple types, which may set the fields of the case. For instance, the case data object with a type adverse event report (AER) may include different fields than a case data object with the type Imported Case. Further, the case data object may include multiple child data objects (also referred to as dependent data objects) such as the case contact data object, the case assessment data object, a case adverse event data object (which may be a child of the case assessment data object), a seriousness data object (which may be a child of the case adverse event data object), an event reported data object (which may be a child of the case adverse event data object), the case product data object (which may be a child of the case assessment data object), a case product registration data object (which may be a child of the case product data object), the case product dosage data object (which may be a child data object of the case product data object), a case identifier data object, a case relationship data object, a case number data object, a case study registration data object (which may be a child of the case study data object), a case diagnosis data object, the source file data object, and the like. Each of these data objects may include one or more child data objects as well as one or more fields for storing values therein. For instance, the case data object may include an external system UID field, an age field, an age unit field, a date of birth field, a priority field, a gender field, a initial received date field, a case number field, etc. and include the child data objects described herein. In another example, the case product data object may include a case name field, a case identifier field, a rank field and the like, and may include a case product registration child data object, an organization child data object, a case product dosage child data object, and a case substance child data object. In this regard, each of the types or pieces of the case data described herein may be a field of the case data object or a child of the case data object (e.g., case contact data may be a field of the case contact data object, etc.). A data object may be a child of or depend on another data object where the child data object cannot exist without the parent data object existing. For instance, a case contact data object cannot exist or be created without the parent case data object being created first. In this regard, the case contact data object depends on and is a child of the case data object.

In this regard, the provider computing system 104 may determine case data by parsing the text data for words and terms that correspond to each of the fields of the case data schema. In one example, the provider computing system 104 may parse the text data for a word or term corresponding to an adverse event (e.g., "headache" "heart attack" "rash", etc.). In some embodiments, the provider computing system 104 may search or parse the text data for terms of the various repositories of the provider computing system 104. For instance, the provider computing system 104 may select each medical product identifier (e.g., product name, product national drug code (NDC), product substance(s) or chemical formula, etc.) from the medical product repository 132 and then search the text data for the specific medical product identifier. In another example, the provider computing system 104 may select each adverse event term and/or code from the adverse event repository 133 and search the text data for the specific terms and/or codes. In some embodiments, the provider computing system 104 may utilize a large language model (LLM) (e.g., Google Gemini®, OpenAI Chat GPT®, an internal LLM, etc.) to search the text data for potential pieces of case data based on the data stored in the repositories of the provider computing system 104.

In one specific example, the medical product repository 132 may include medical product data for three specific medical products (e.g., Drug X, Drug Y, and Vaccine Z). Accordingly, at step 212, the provider computing system 104 may retrieve the name (e.g., Drug X) of the name field of the first medical product data and parse the text data for the specific name. If the provider computing system 104 determines the text data includes the name, the provider computing system 104 may determine the medical product of the case data is the medical product. In some embodiments, the provider computing system 104 may further mark or indicate on the graphical user interface the location of the medical product in the text data (e.g., generate a comment and highlight, as will be described further herein) for the user of the client computing device 112 to review. The provider computing system 104 may then repeat the process for the second medical product and the third medical product.

In this regard, the provider computing system 104 may parse the text data and determine portions of the case data based on the text data. In one example, the provider computing system 104 may determine a case identifier or WWUID, two adverse event terms, a medical product name, a reporter name, a reporter title, a reporter contact address, a patient's initials, a patient's date of birth, a seriousness based on the case data. Once the provider computing system

104 has determined portions of the case data, the provider computing system 104 may provide the source file, the text data, and the portions of the case data to one of the client computing devices 112 for rendering and display on a user interface (e.g., on the document viewer page 400).

The source file and text data may be displayed in a document viewer (e.g., a document viewer section 404) and the case data may be displayed in a case data panel (e.g., a case data panel 420). The user of the client computing device 112 may review the case data of the case data panel, verify it is correct, and identify additional portions of case data in the text data. For instance, the user may select a highlight function of a specific case data section and highlight or select additional case data from the text data. In one example, the user may select a highlight function of a product section (e.g., a product section 454) of the case data panel. The user may then highlight the term "Drug X" of the text data located in the document viewer, and the user computing device 112 may populate the term "Drug X" into the product section. The user computing device 112 may then provide the selections of case data to the provider computing system 104. In this regard, the provider computing system 104 may determine case data by analyzing the text data and by receiving selections of the text data.

In some embodiments, the provider computing system 104 may further determine case data by transforming text data that is in an incorrect format into a correct format (e.g., "SE" to "Sweden", from a first date format (e.g., yy-mm-dd) to a second date format (e.g., dd-mm-yy)). In another example, the provider computing system 104 may receive a selection of text data that represents a specific country (e.g., a country acronym (e.g., USA, FR, UK, etc.)). Then, in response, the provider computing system 104 may transform the text data to a specific country (e.g., "United States of America," "France," "United Kingdom," etc.). In some embodiments, the corresponding case data field may be a picklist that includes a set number of values which are allowed for the field (e.g., country can be one of "United States of America," "France," "United Kingdom," etc., reporter qualification can be one of "Physician, "Physician Assistant," "Nurse Practitioner, etc.). In that regard, the provider computing system 104 may receive the selected text data, which is in an incorrect format and determine/retrieve each of the values of the corresponding picklist. Then, the provider computing system 104 may compare the selected text data to each of the values of the corresponding picklist, and determine a matching value. The provider computing system 104 may then, set the field as the matching value.

In one example, the provider computing system 104 may receive text data in association with the field "reporter country". The text data may include the term "USA." Accordingly, the provider computing system 104 may return each of the picklist values associated with the field "reporter country," such as "United States of America," "France," "United Kingdom," "Japan," and so on. Accordingly, the provider computing system 104 may match the term "USA" to "United States of America," and select the "United States of America," as the reporter country field.

Further, at or before step 212, the provider computing system 104 may retrieve data from the repositories of the provider computing system 104 and determine additional case data by matching the determined case data with the medical product and/or study information. For example, the provider computing system 104 may receive a selection of text data that includes the term "Drug X". The provider computing system 104 may then search the medical product repository 132 for medical product data pertaining to Drug X and return additional values and medical product data (e.g., dosage of medical product X, the chemical formula of medical product X, expected side effects of medical product X, a clinical study that medical product X is currently being studied in, a clinical study #, pertaining to medical product X, and the like) as previously provided by the user. This additional medical product data and study information may then be included in the case data. In another example, the provider computing system 104 may receive a selection of the text data including the term "headache". Accordingly, the provider computing system 104 may query the adverse event repository 133 and return the corresponding adverse event code. The adverse event code and term may then be included in the case data.

Figure 4A:
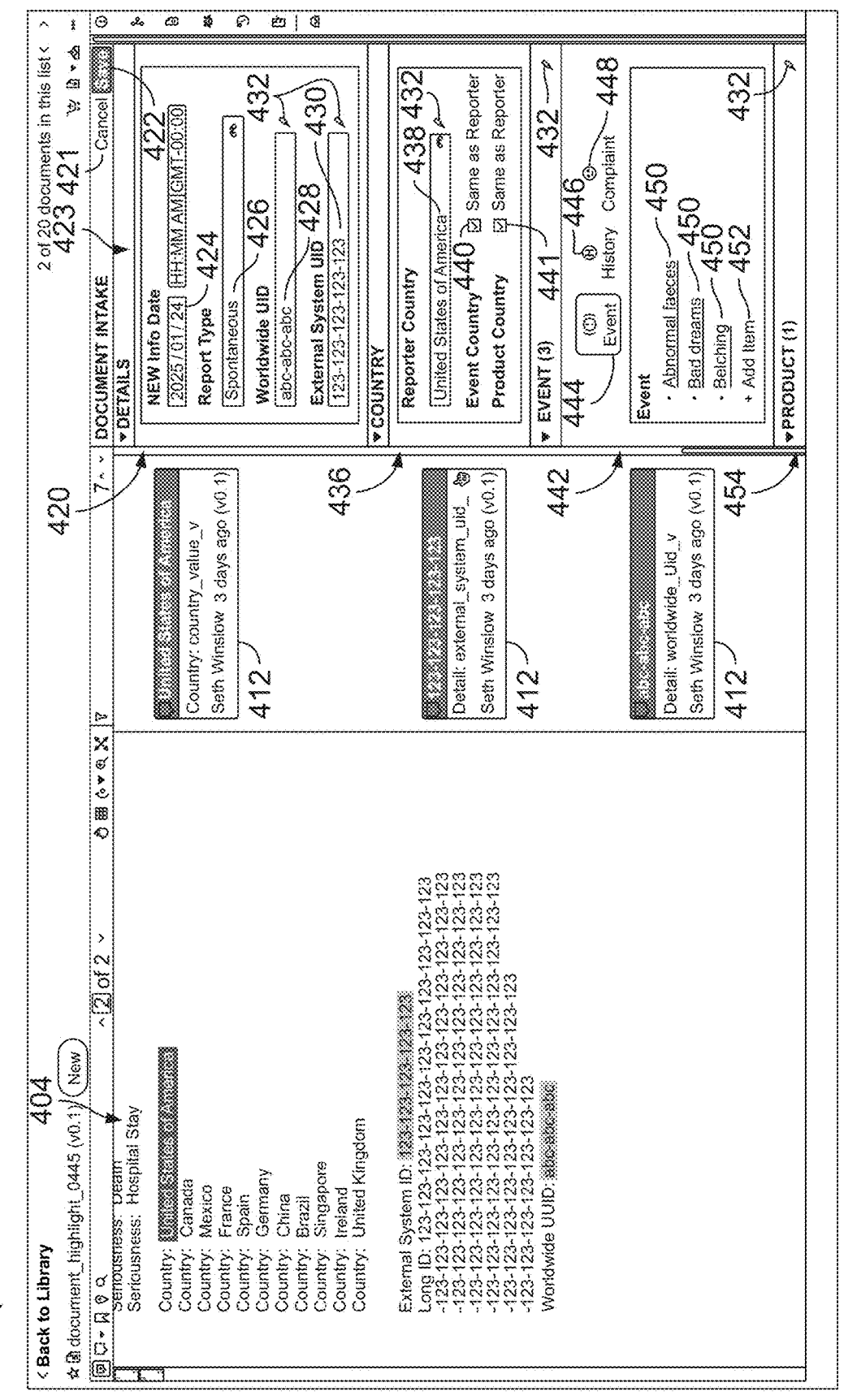
FIGS. 4A-4D may be illustration of some aspects of a user interface generated by the digital data interpretation and processing system of FIG. 1 to interpret and structure text data of a source file via highlighting, according to an example embodiment.
Figure 4B:
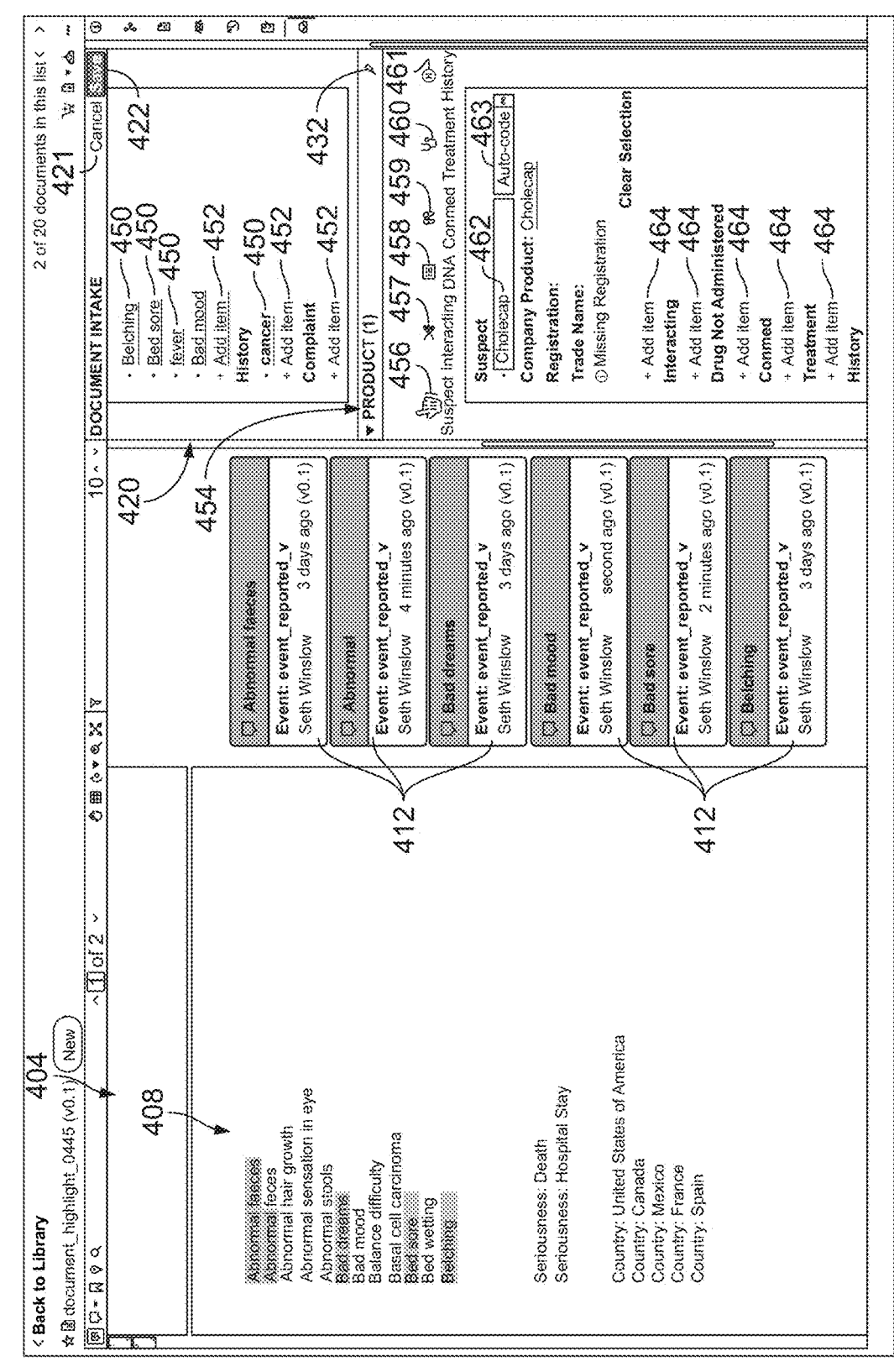
Figure 4C:
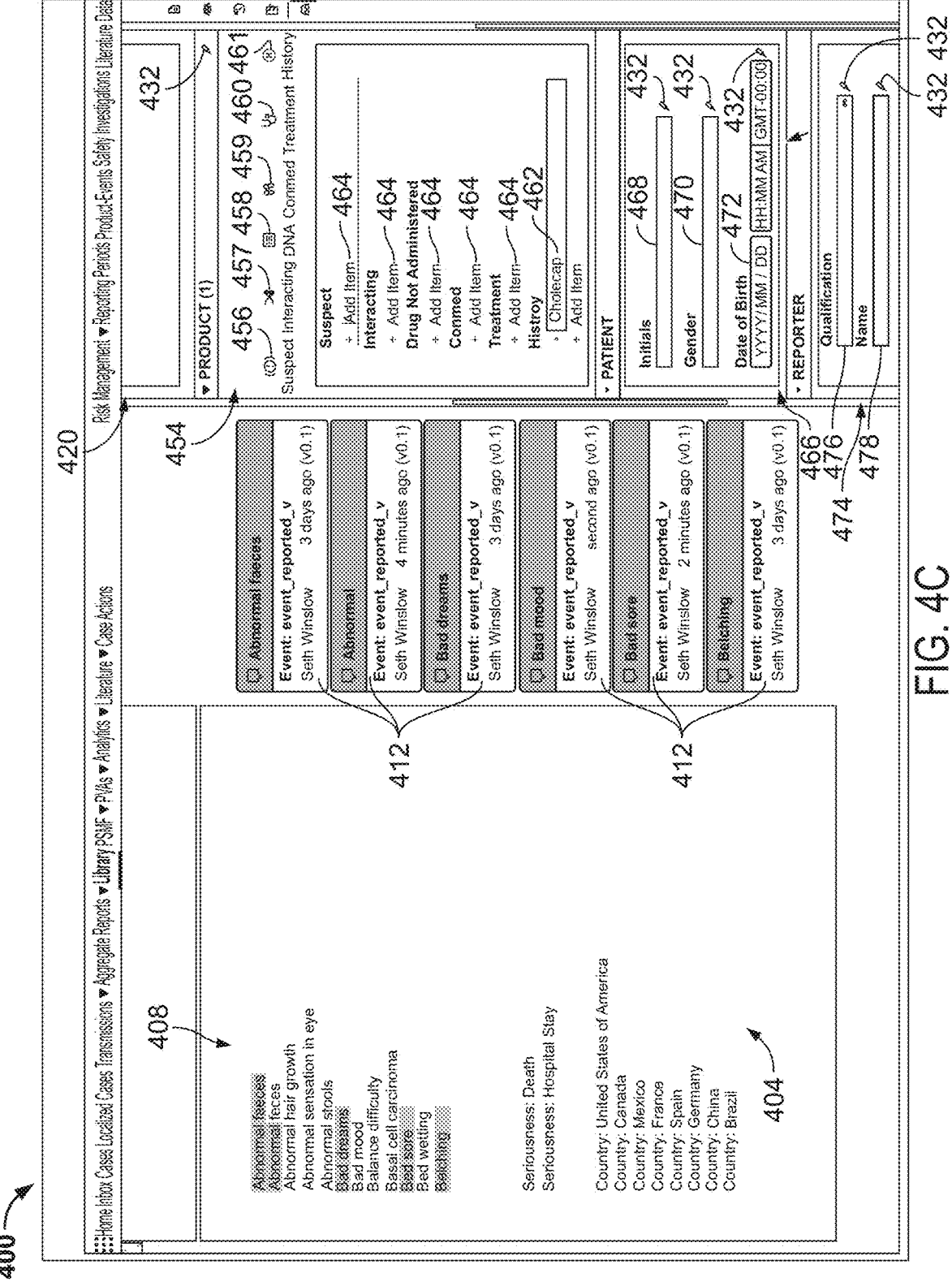
Figure 4D:
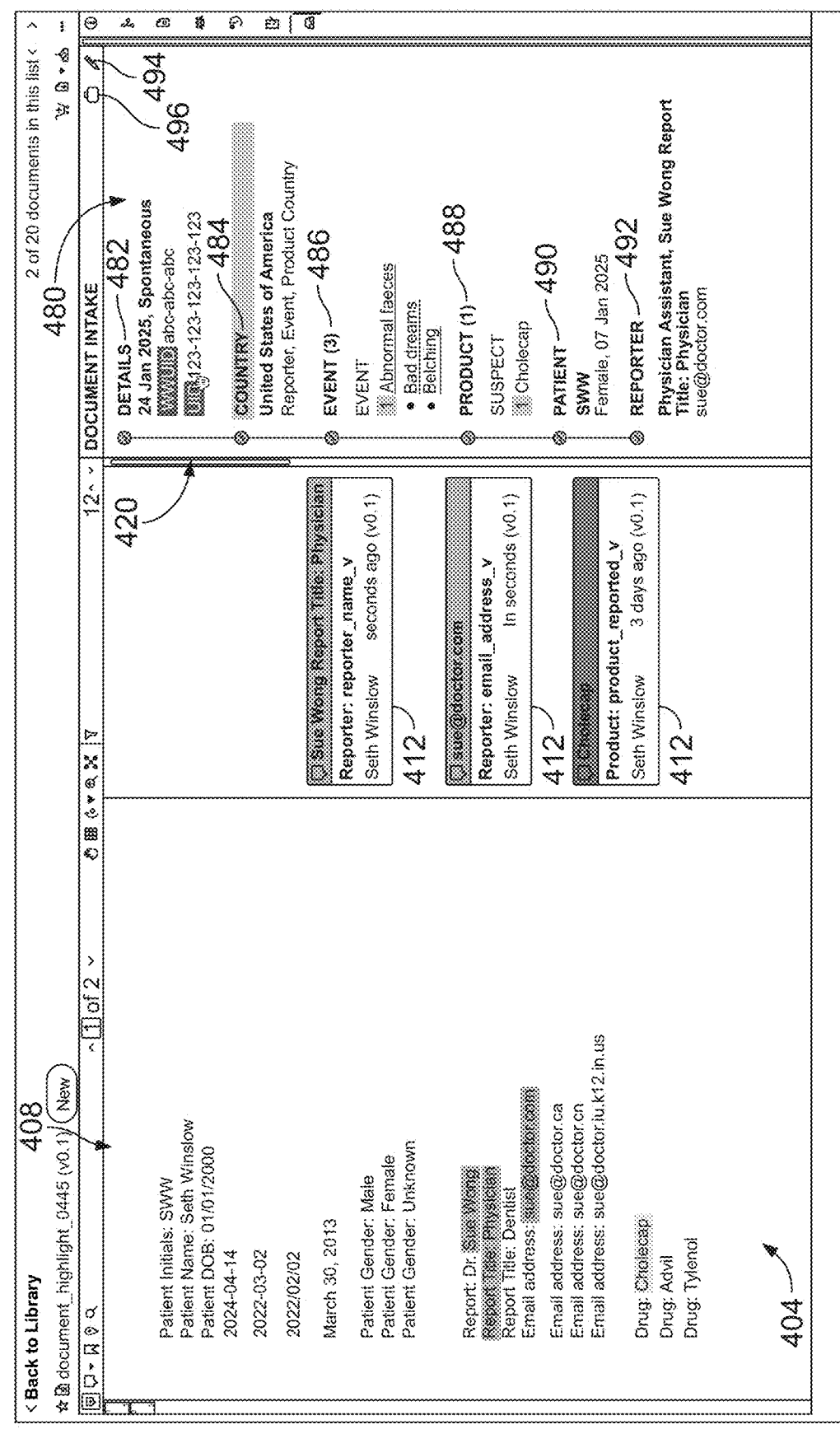

Once the provider computing system 104 has determined the case data, the method 200 proceeds to step 216 at which the provider computing system 104 determines if the case data is complete and validates the case data. In some embodiments, the provider computing system 104 may determine the case data is complete in response to determining the case data includes at least one detail field (e.g., a case identifier), at least one country field, at least one adverse event term, at least one medical product, patient data (e.g., at least one patient field), and reporter data (e.g., at least one reporter field) (see FIG. 4D). In some embodiments, if the case data is not complete, the provider computing system 104 may not proceed to step 220. In some embodiments, if the case data is not complete, the provider computing system 104 may generate a notification indicating the case data is not complete but still proceed to step 220. In some embodiments, the provider computing system 104 may determine if each type of data of the case data is complete (e.g., case identifier, country, adverse events, medical products, patient data, reporter data, etc.) and provide an indication on the user interface that each type of data is complete.

Once the provider computing system 104 has determined the case data is complete, the method 200 proceeds to step 220 at which the provider computing system 104 determines if the case data is duplicative. For instance, the provider computing system 104 may search the case repository 134 for any cases that match the UID (e.g., also include the same UID). Further, the provider computing system 104 may search within or query the case repository 134 in other ways. For example, the provider computing system 104 may search or query the database for cases that include the same case information (e.g., same report type, same receipt or new info date, and/or the like), cases that include the same patient information (e.g., same patient ID, same gender, same medical record number (MRN), and/or the like) cases that include the same reporter information (e.g., same reporter qualification, same reporter name, same reporter country, and/or the like) regardless of the rank of the reporter, cases that include the same medical product information (e.g., same medical product name, same medical product dosage, same chemical formula, and/or the like) regardless of the rank of the medical product, and/or cases that include the same adverse event information (e.g., same reported event (e.g., "headache"), same MedDRA code, same event country, same event onset date, and/or the like). In some embodiments, the rank of the reporter is taken into consideration when searching or querying the database for cases that include the same case information (e.g., the primary reporter is the only reporter considered).

Figure 5:
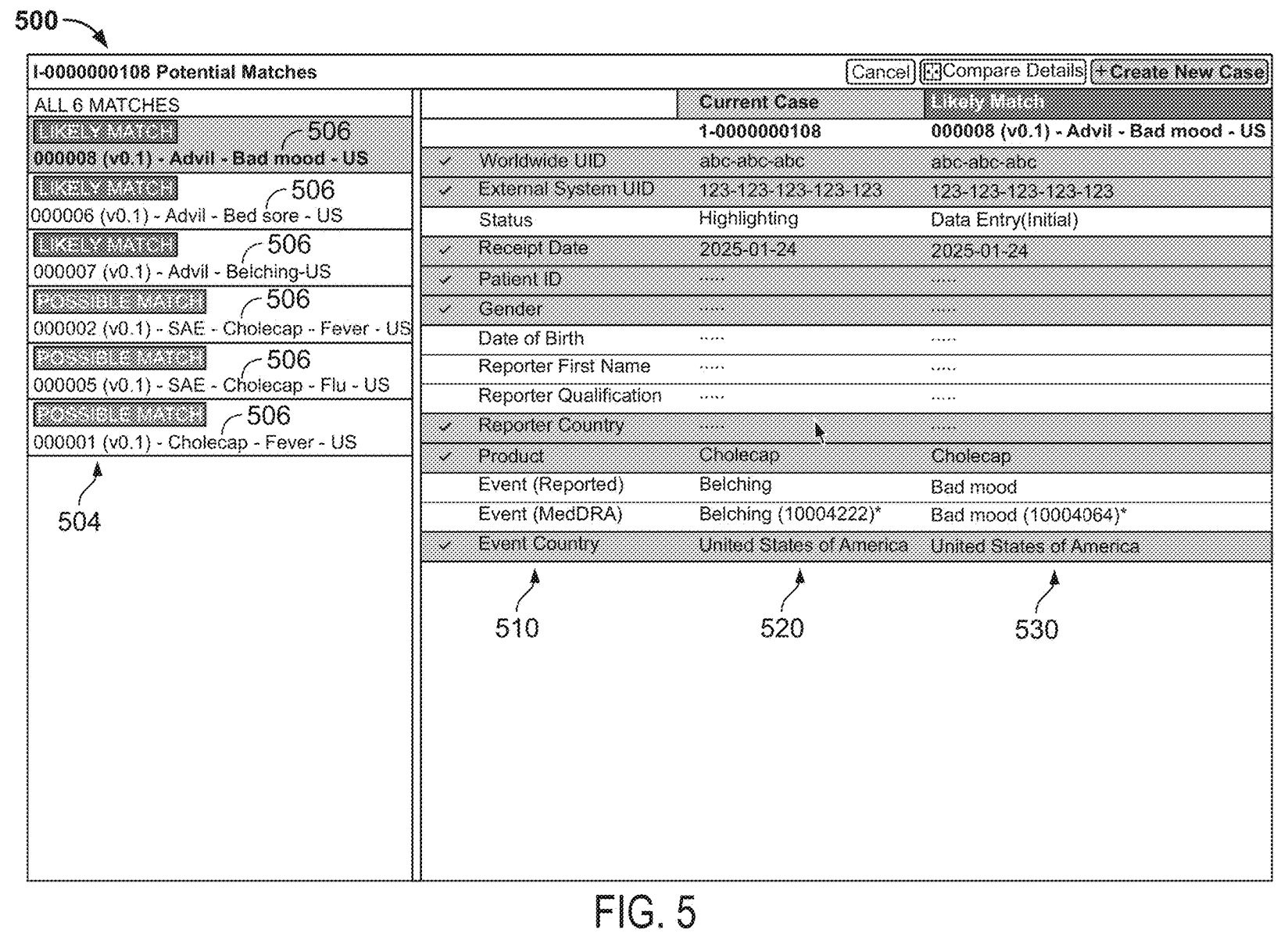

Once the provider computing system 104 has determined one or more potentially duplicative case datasets, the provider computing system 104 may provide the case data of the case datasets to the client computing device 112 for display and comparison thereon (see FIG. 5). In some embodiments, the provider computing system 104 may determine the case datasets are not duplicates of the case data in response to receiving an indication from the client computing device 112. In comparison, if the provider computing system 104 determines the case data is a duplicate or related to one of the case datasets (e.g., by receiving an indication from the client computing device 112), the provider computing system 104 may link the case data to the related case data.

Once the provider computing system 104 has determined the case data is not duplicative, the provider computing system 104 may proceed to step 224 at which the provider computing system 104 generates a case dataset including the case data. Further, at or after step 235, the provider computing system 104 may store the case dataset in the case repository 134. In some embodiments, the step 224 and generating a case are initiated by receiving an indication from the user (e.g., from the client computing device 112) to generate a case. In some embodiments, at or before step 224, the provider computing system 104 may generate the case data object and populate it with the cased data (e.g., each of the fields and child data objects determined at step 916). For instance, at step 224, the provider computing system 104 may generate the case data object and populate the case data object with the fields and child data objects. In some embodiments, the provider computing system 104 may determine the case data of the case data object to be included in the case dataset. For instance, the provider computing system 104 may determine the case is to be submitted to the FDA (e.g., based on the medical product registration(s) of the medical product or the country in which the adverse event occurred). In response, the provider computing system 104 may select a portion of the case data which is applicable to the FDA, and not select other information which is not applicable to the FDA (e.g., the priority value, etc.).

Once the provider computing system 104 has generated the case dataset, the method 200 proceeds to step 228 at which the provider computing system 104 outputs the case dataset. For instance, the provider computing system 104 may be configured to provide the case dataset to one or more of the partner computing systems 108 and the client computing devices 112. In one example, the case dataset may be stored in the form of an E2B (R3) XML file and provided to one or more of the partner computing systems 108 and the client computing devices 112 via an AS2 Gateway communication. In some embodiments, the provider computing system 104 may provide the case based on the priority of the case (e.g., a case with priority of one is provided before a case with a priority of two). In other embodiments, the provider computing system 104 may receive an indication or request from the client computing device 112 to provide the case dataset to the partner computing system 108 and do so in response. In some embodiments, the provider computing system 104 may automatically provide the case dataset based on the timeframe of the case. For example, if the case dataset had a timeframe of seven days from receipt of the source file and it has been seven days from receipt of the source file, the provider computing system 104 may automatically provide the case dataset to one or more of the partner computing systems 108 and the client computing devices 112.

Figure 3:
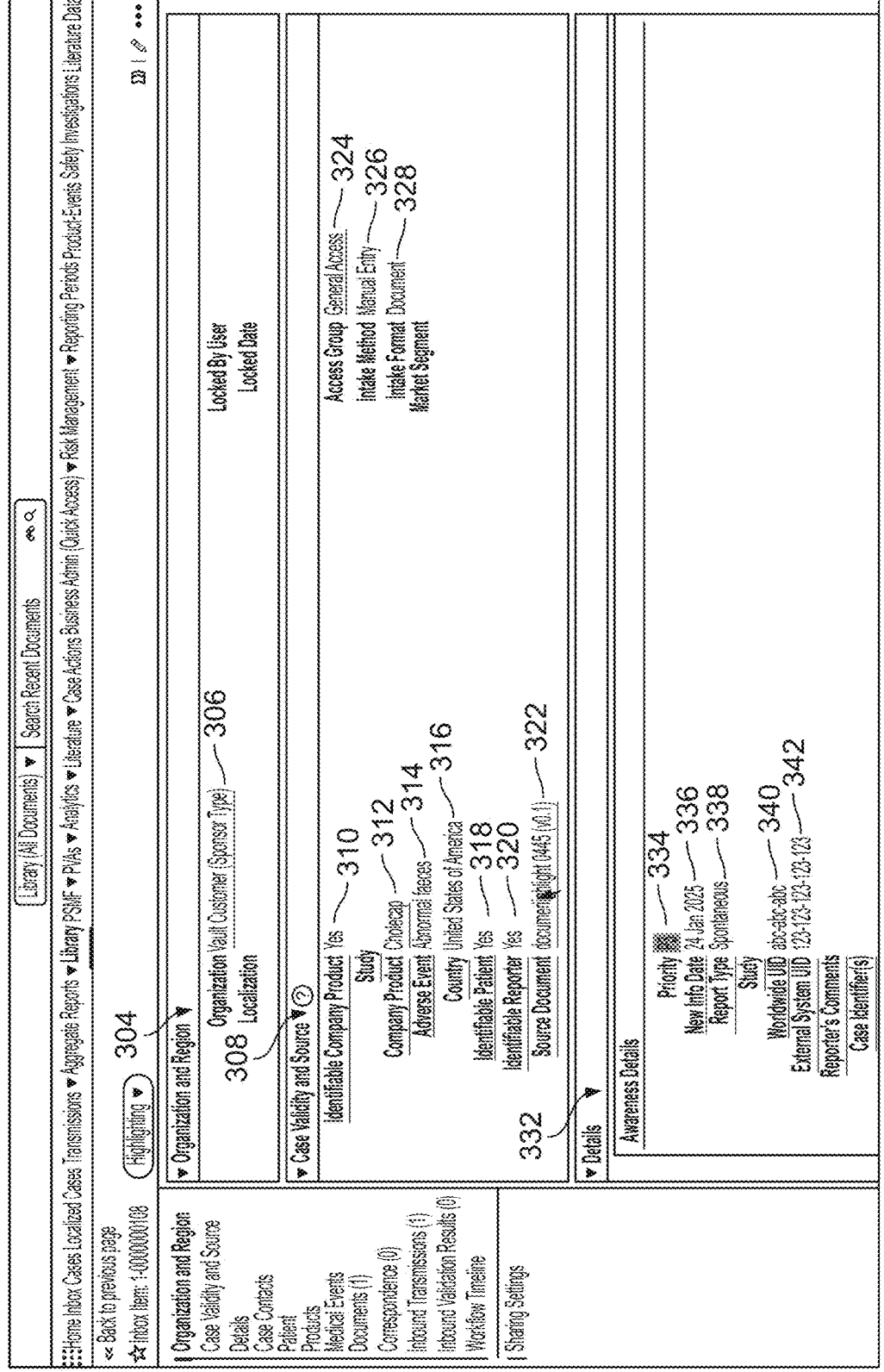
FIG. 3 may be an illustration of some aspects of a user interface generated by the digital data interpretation and processing system of FIG. 1 to manage a received source file, according to an example embodiment.

Referring now to FIGS. 3-5, user interfaces shown and displayed to the user of the one or more client computing devices 112 during the method 200 are shown, according to example embodiments. As described herein, the user interfaces of FIGS. 3-5 may be one or more of web interfaces generated by the provider computing system 104 and rendered by each of the client computing devices 112 as part of a web application or graphical user interfaces downloaded and generated by each of the client computing devices 112 as part of a software application (e.g., a mobile application, etc.). Further, the user interfaces shown on FIGS. 3-5 allow for communication between the user) and the provider computing system 104 via the respective client computing device 112 (specifically via the I/O circuit 180, respectfully). Through interaction with the various user interfaces, the user may provide user input, feedback, and other data requested by the provider computing system 104. In this regard, it should be understood that each interaction described herein by the user with the user interfaces of FIGS. 3-5 may be provided to one or more of the client computing devices 112 and then transmitted to the provider computing system 104 and that each action described herein as occurring to the respective client computing device 112 (e.g., navigating to a certain page, generating a popup, etc.) may be performed by the provider computing system 104.

Referring now to FIG. 3, an inbox item page 300 which can be displayed on a display the I/O circuit 180 of the client computing device 112, is shown. In general, the inbox item page 300 provides the user an interface to setup, modify, and manage a specific inbox item (also referred to as a source file) received by the provider computing system 104. As shown, the inbox item page 300 includes an organization and regions section 304, a case validity and source section 308, and a details section 332. To render or generate the inbox item page 300 on the client computing device 112, the provider computing system 104 may provide a specific source file and associated adverse event data to the client computing device 112. In this regard, it should be understood that each of the sections, fields, or buttons of the inbox item page 300 may be or included in the source files and adverse event data of the source files described herein.

The case validity and source section 308 provides the user of the respective client computing device 112 with an interface to manage and review a specific source file or inbox item. As shown, the case validity and source section 504 includes an identifiable company product field 310, a study field (not shown), a company or medical product field 312, an adverse event field 314, a country field 316, a identifiable patient field 318, an identifiable reporter field 320, a source document field 322, an access group field 324, an intake method field 326, and an intake format field 328. The fields 310-338 may each represent a specific field of a source file. In that regard, each of the fields 310-338 may be associated with a specific piece of data of the source file. In some embodiments, when the provider computing system 104) determines the case dataset fields prior to receiving selections from the user interface, the corresponding values may be added to one of the fields 310-338. For instance, a specific medical product determined by the provider computing system 104, may be displayed in the medical product field 312.

Referring now to FIGS. 4A-4D, the document viewer page 400 which can be displayed on a display the I/O circuit 180 of the client computing device 112, is shown. In general, the document viewer page 400 provides the user an interface to view, modify, and select case data from a specific source file received by the provider computing system 104. As shown, the inbox document viewer page 400 includes the document viewer section 404 and the case data panel 420. To render or generate the document viewer page 400 on the client computing device 112, the provider computing system 104 may provide the source file, the text data of the source file, and the determined case data to the client computing device 112. In this regard, it should be understood that each of the sections, fields, or buttons of the case data panel 422 may include case data, and the sections, fields, or buttons of the document viewer section 404 may include adverse event data.

The document viewer section 404 provides the user of the respective client computing device 112 an interface to view the source file and select text data therein to create to indicate the text data is a specific portion of the case data (e.g., medical product, adverse event, reporter, etc.). As shown, the document viewer section 404 includes multiple text sections (also referred to as linguistic sections) 408 and one or more comments or markers 412.

The linguistic sections 408 may include text data of the source file and one or more indications (e.g., highlights, underline, italicized text, bolded text, a specific marker next to the text, etc.) For instance, the user of the client computing device 112 may select a specific word and/or term of one of the linguistic sections 408 and apply an indication. In some embodiments, the indications may be applied in response to selecting a highlight button 432 of the case data panel 422. In this regard, each indication may be associated with a specific field or portion of the case data, as described herein.

The comments or markers 412 may correspond to the indications of the text data of the linguistic sections 408 and provide specific data associated with the indications, such as field or portion of case data associated with the identifier and the comment 412 (e.g., "reporter email address," "reporter name," medical product, adverse event, "external system unique identifier (unique identifier (UID))," worldwide unique identifier (WWUID), etc.), username of the user who generated the indication (e.g., Seth Winslow, system, etc."), the date/time the indication was generated, the selected text data (e.g., United States of America, etc.). If the provider computing system 104 identified/selected the case data from the text data, the comment may include a username associated with the provider computing system 104 (e.g., "system," "automatic selection," "system processed," etc.).

In some embodiments, the indications of the linguistic section 408 and the comments 412 may be a specific color based on the associated portion of the case data. For instance, an indication or comment 412 associated with the country of the case dataset may be include the color dark green, an indication or comment 412 associated with a details field (e.g., WWUID, report type, etc.) may include the color purple, an indication or comment 412 associated with an adverse event may include the color orange, an indication or comment 412 associated with a medical product may include the color pink, and an indication or comment 412 associated with a reporter field (e.g., reporter email address, reporter name, etc.) may include the color light green, an indication or comment 412 associated with a patient field (e.g., patient initials, date of birth, etc.) may include the color blue.

By utilizing different colors for each specific section or portion of the case data (e.g., a specific color for comments and indications associated with the details section 420, a specific color for comments and indications associated with the product section 454, etc.), the present systems and methods provide for easier viewing and visual interpretation of which sections are represented or included in the text data, and thereby provide an improvement to user interface and document highlighting systems. For instance, because the provider computing system 104 highlights the specific portions of the text data in a color associated with the section or portion of the case data and generates a comment including the color associated with the section or portion of the case data, the present systems and methods provide for easier visualization and analysis by a user.

Still referring to FIGS. 4A-4D, the case data panel 422 provides the user of the respective client computing device 112 an interface to view the selected case data (e.g., medical product, adverse event, reporter, etc.) and select or enter additional case data. As shown, the case data panel 420 includes a cancel button 421, a save button 422, a details section 423, a country section 436, an event section 442, a product section 454, a patient section 466, a reporter section 474, a summary or validation section 480, an edit button 494, and a promote to case button 496. In some embodiments, the case data panel 422 further includes a study section (not shown).

Each of the sections 423-474 may be associated with a specific portion or piece of the case data (e.g., the country section 436 is associate with country data of the case data, the event section 442 is associated with adverse events of the case data, etc.). In this regard, the user of the client computing device 112 can add specific data to the case data through interaction with the corresponding section.

The details section 423 includes and receives general details of the case data, and includes a new info date field 424, a report type field 426, a WWUID field 428, an external system UID field 430, and one or more highlight or selection buttons 432.

The new info date field 424 may include the most recent date on which new data was received (e.g., the date on which the source file was received). Likewise, the report type field 426 may be a drop-down box or picklist field that includes the type of the ICSR (e.g., spontaneous, study-driven, etc.). The WWUID 428 and the external UID field 430 may each be text fields that include a unique identifier of the case dataset. In that regard, the WWUID field 428 may include a unique identifier specific to the case dataset across all systems, and the external UID field 430 may include a unique identifier specific to one or more external systems.

The one or more selection buttons 432 may each be selectable buttons that are adjacent to one of the fields 424-430 to select text data from the document viewer 404. For instance, the user of the client computing device 112 may select the selection button 432 adjacent to the field they want to import (e.g., the WWUID field 428). Then, on the document viewer 404, the user may select and drag over the text data that is to be imported into the corresponding field. In one example, the user may select the selection button 432 directly adjacent (or closest to) the WWUID field 432. Next, the user may navigate their cursor or mouse to the text data of the document viewer 404 which corresponds to the WWUID. Next, the user may click or select their cursor and drag it across the term (e.g., "abc-abc-abc", see FIG. 4A). In response, the client computing device 112 may import or select the text data into the WWUID field 432, generate and display indication on the text data in the document viewer 404, and generate and display a comment 412 corresponding to the selection.

The country section 436 includes and receives country data of the case data, and includes a reporter country field 438, an event country checkbox 440, a product country checkbox 441, and one or more selection buttons 432. The event country checkbox 440 and the product country checkbox 441 are each selectable checkboxes to indicate whether the country for the event(s) and the product(s) are the same as the reporter country field 438. In some embodiments, the country section 436 includes an event country field (not shown) and a product country field (not shown).

The reporter country field 438 is a text or picklist field that includes the country within which the reporter reported the adverse event. Accordingly, through use of the selection button 432 directly adjacent (e.g., closest to) the reporter country field 438, the user can set the text data of the document viewer 404 that corresponds to the country of the reporter.

The event section 442 includes and receives adverse event terms and codes of the case data, and includes an event button 444, a history button 446, a complaint button 448, multiple adverse event fields 450, an add event button 452, and one or more selection buttons 432. The buttons 444-448 may set the type of the adverse event term and/or code and filter the adverse event fields 450 displayed in the event section 442. For instance, because adverse event terms and codes (e.g., MedDRA terms) can be used in multiple roles (current adverse events, historical adverse events, medical complaints, indications, etc.).

Accordingly, the user of the client computing device 112 may select the type of the adverse event term (via one of the buttons 444-448) and then select the selection button 432 of the event section 442. Then, in response to selecting text data of the document viewer 404, the client computing device 112 may populate a corresponding event field 450 with the selected term. For instance, the user may select the history button 446 followed by the selection button 432. Then, in response to selecting the text data "cancer," the term "cancer" may be populated into an adverse event field 450 under the "History" heading. Likewise, each field may be associated with the type of the adverse event specified on the selected button (e.g., History). Further, the user may select the add event button 452 to manually add and enter an adverse event (e.g., via an input device) into an adverse event field 450.

In other embodiments, each heading (e.g., Adverse Event, History, Complaint, etc.) may include a selection button 432 directly adjacent, which can be selected to select adverse events for inclusion as an adverse event field 450. For instance, the event section 442 may include three selection buttons 432, one directly adjacent the heading "Adverse Event," one directly adjacent the heading "history," and so on.

The product section 454 includes and receives medical products and medical product data of the case data, and includes a suspect product button 456, an interacting product button 457, a DNA product button 458, a Conmed product button 459, a treatment product button 460, a history button 461, multiple product fields 462, an add product button 464, and one or more selection buttons 432. The buttons 456-461 may set the type of the product and filter the product fields 462 displayed in the product section 454.

For instance, the user of the client computing device 112 may select the type of the product (via one of the buttons 456-461) and then select the selection button 432 of the product section 454. Then, in response to selecting text data of the document viewer 404, the client computing device 112 may populate a corresponding product field 462 with the selected term. For instance, the user may select the history button 461 followed by the selection button 432. Then, in response to selecting the text data "Drug X," the term "Drug X" may be populated into an product field 462 under the "History" heading. Likewise, each field may be associated with the type of the product specified by the specific button.

Further, the user may select the add product button 464 to manually add and enter a product (e.g., via an input device) into a product field 462.

Each product field 462 may include a specific medical product name and an auto code button 463 directly adjacent the product field 462. The autocode button 463 may be a selectable button that sends a request to the provider computing system 104 to search a code repository (not shown) for a term and/or code that matches the value included in the product field 462. If a matching term and/or code is determined, the provider computing system 104 may automatically populate the product field 462 with the corresponding term and/or code.

The patient section 466 includes and receives patient data of the case data, and includes a patient initials field 468, a patient gender field 470, a patient date of birth (DOB) field 472, and one or more selection buttons 432.

The patient initials field 468 is a text field that includes the initials of the patient who experienced the adverse event. Accordingly, through use of the selection button 432 directly adjacent (e.g., closest to) the patient initials field 468, the user can set the text data of the document viewer 404 that corresponds to the initials of the patient.

The patient gender field 470 is a text or picklist field that includes the gender of the patient who experienced the adverse event. Accordingly, through use of the selection button 432 directly adjacent (e.g., closest to) the patient gender field 470, the user can set the text data of the document viewer 404 that corresponds to the gender of the patient.

The patient DOB field 472 is a text or picklist field that includes the DOB of the patient who experienced the adverse event. Accordingly, through use of the selection button 432 directly adjacent (e.g., closest to) the patient DOB field 472, the user can set the text data of the document viewer 404 that corresponds to the DOB of the patient.

The reporter section 474 includes and receives reporter data of the case data, and includes a reporter qualification field 476, a reporter name field 478, a reporter contact address or email field (not shown), and one or more selection buttons 432.

The reporter qualification field 476 is a text or picklist field that includes the qualification or title of the reporter who reported the adverse event. Accordingly, through use of the selection button 432 directly adjacent (e.g., closest to) the reporter qualification field 476, the user can set the text data of the document viewer 404 that corresponds to the qualification of the reporter.

The reporter name field 478 is a text or picklist field that includes the name of the reporter who reported the adverse event. Accordingly, through use of the selection button 432 directly adjacent (e.g., closest to) the reporter name field 478, the user can set the text data of the document viewer 404 that corresponds to the name of the reporter.

Still referring to FIGS. 4A-4D, the cancel button 421, the save button 422, and the edit button 494 may be used to change the view of the case data panel 420. For instance, in response to a selection of the save button 422, each of the values entered of the case data panel 420 may be provided to the provider computing system 104, by the client computing device 112 for storage as case data. Further, in response to a selection of the save button 422, the validation section 480 may be displayed in the case data panel 420. In comparison, in response to a selection of the edit button 494, each of the section 423-474 may be displayed in the case data panel 420. Further, in response to a selection of the cancel button 421, the values and data entered into the case data panel may be deleted by the client computing device 112.

The validation section 480 may correspond to step 216 of the method 200. For instance, in response to selecting the save button, each of the values entered of the case data panel 420 may be provided to the provider computing system 104, by the client computing device 112 for storage in case data. Then, in response, the provider computing system 104 may determine if the case data is complete and/or if any values are missing. In some embodiments, the provider computing system 104 may validate each section or portion of the case data including the details, the country, the event(s), the product(s), the patient, and the reporter. Then, the provider computing system 104 may send an indication to the client computing device 108 if any sections are missing any values or data.

As shown, the validation section 480 includes a details section indication 482, a country section indication 484, an event section indication 486, a product section indication 488, a patient section indication 490, and a reporter section indication 492. If any of the sections are missing data, the section corresponding to the data type may display an indication of such. For instance, if the case data does not include a medical product, the provider computing system 104 may provide an indication the case data is not complete, which may be indicated in the event section indication 486. For instance, the event indication section 486 may include a specific symbol (an "x" as compared to a checkmark, an exclamation point, etc.) and/or a specific color (e.g., red or yellow as compared to green).

Likewise, the promote to case button 496 may be a selectable button that is displayed on the case data panel 420 proximate the validation section 480. Accordingly, in response to a selection of the promote to case button 496, the client computing device 112 may generate a request to generate a case dataset based on the case data. If the case data is complete (as indicated in the validation section 480), the provider computing system 104 may receive the request and generate a case dataset.

Referring now to FIG. 5, a case comparison page 500 which can be displayed on a display the I/O circuit 180 of the client computing device 112, is shown. In general, the case comparison page 500 provides the user an interface to view, determine, and indicate if the case data is duplicative of one or more case datasets of the case repository 134. As shown, the case comparison page 500 includes a case listing 504, a comparison section 510, a case data section 520, and a case dataset section 530. To render or generate the case comparison page 500 on the client computing device 112, the provider computing system 104 may the determined case data and case data of one or more case datasets of the case repository 134 to the client computing device 112.

The case listing 504 includes multiple case representations 506 ranked by the likelihood or rating of the match between the case data and the case dataset. For instance, the case representations 506 associated with case datasets which are ranked as a first ranking (e.g., likely match) may be listed in the case listing 504 higher than case representations 506 associated with case datasets which are ranked a second ranking (e.g., possible match). In some embodiments, each case representation 506 may be selectable, and when selected, the client computing device 112 may request the corresponding case data from the provider computing system 104. In response, the provider computing system 104 may output the requested case data for display and comparison in the comparison section 510 and the case dataset section 530.

In that regard, the case dataset section 530 may display, in a line by line manner, the case data of the potentially matching case dataset, whereas the case data section 520 may display the determined case data, in a line by line manner, for direct comparison. Likewise, the comparison section 510 may provide an indication, in a line by line manner, when the fields match (e.g., by highlighting the line and including a green checkmark) or when the fields do not match (e.g., by not highlighting the line or including a red x).

The embodiments described herein have been described with reference to the drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provision of 35 U.S.C § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexors, registers, capacitors, inductors, diodes, wiring, and so on.

The "circuit" may also include one or more processors communicably coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other embodiments, two or more processors may be coupled via a bus to enable independent, parallel, pipelined, or multi-threaded instruction execution. Each processor may be implemented as one or more general purpose processors, application specific integrated circuits (ASICs), field programmable gate arrays (FPGAs), digital signal processors (DSPs), or other suitable electronic data processing components structured to execute instructions provided by the memory. The one or more processors may take the form of a single core processor, a multi-core processor (e.g., dual core, quad core, etc.), microprocessor, etc. In some embodiments, the one or more processors may be external to the apparatus. For example, the one or more processors may be a remote processor (e.g., a cloud-based processor). Alternatively or additionally, the one or more processors may be internal and/or local to the apparatus. In this regard, a circuit or components thereof may be disposed locally (e.g., as part of a local server, a local computing system) or remotely (e.g., as part of a remote server such as a cloud-based server). To that end, a "circuit" as described herein may include components that are distributed across one or more locations. Further, each of the circuits described herein may be distributed across one or more locations (e.g., each as part of one or more remote servers).

An example system for implementing the overall system or portions of the embodiments might include a general purpose computing device in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile storage media may take the form of ROM, flash memory (e.g., flash memory such as NAND, 3D NAND, NOR, 3D NOR), EEPROM, MRAM, magnetic storage, hard disks,optical disks, etc. Combinations of the above are also included within the scope of machine-readable media. In this regard, machine-executable instructions comprise, for example, instructions and data which cause a general purpose computer, special purpose computer, or special purpose processing machine to perform a certain function or group of functions. Each respective memory device may be operable to maintain or otherwise store data relating to the operations performed by one or more associated circuits, including processor instructions and related data (e.g., database components, object code components, script components), in accordance with the example embodiments described herein.

It should also be noted that the term "input devices," as described herein, may include any type of input device including, but not limited to, a keyboard, a keypad, a mouse, a joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes, and omissions may be made in the design, operating conditions and embodiment of the embodiments without departing from the scope of the present disclosure as expressed in the appended claim.

What is claimed is:

1. A method for digitally interpreting a linguistic section of a source file to generate a case dataset, the method comprising:

receiving, by a provider computing system, the source file including the linguistic section;

generating, by the provider computing system, text data based on the linguistic section, wherein the text data is in a first language;

translating, by the provider computing system, the text data from the first language to a second language;

selecting, by the provider computing system, a medical product identifier from a first repository;

determining, by the provider computing system, a first portion of the text data includes the medical product identifier;

outputting, by the provider computing system, the text data to a client computing device to enable display on a user interface comprising:

a document viewer section including the text data, wherein the first portion of the text data including the medical product identifier includes a first indication, and wherein a second portion of the text data including an adverse event term includes a second indication in response to the document viewer section receiving a selection of the second portion; and a case data panel including a medical product section and an adverse event section, wherein the medical product section includes a medical product field including the medical product identifier, and wherein the adverse event section includes an adverse event field including the adverse event term in response to the document viewer receiving the selection of the second portion;

determining, by the provider computing system, case data including the medical product identifier and the adverse event term;

generating, by the provider computing system, the case dataset including the case data; and outputting, by the provider computing system, the case dataset.

2. The method of claim 1, wherein the document viewer section further includes a first comment including the medical product identifier and a username associated with the provider computing system.

3. The method of claim 2, wherein the document viewer section further includes a second comment including the adverse event term and a username associated with a specific user in response to the document viewer receiving a selection of the second portion.

4. The method of claim 1, wherein the case data panel further includes a details section, a country section, a patient section, and a reporter section.

5. The method of claim 4, further comprising:

determining, by the provider computing system, the case data is complete by determining the case data includes at least one detail field, at least one country field, at least one patient field, at least one reporter field, the adverse event term, and the medical product identifier.

6. The method of claim 5, wherein the user interface further includes a validation section, and wherein the validation section provides an indication the case data is complete in response to determining the case data is complete.

7. The method of claim 1, wherein the first indication is a highlight over the first portion of the text data in a first color, wherein the second indication is a highlight over the second portion of the text data in a second color, and wherein the first color does not match the second color.

8. The method of claim 1, wherein the medical product identifier is at least one of: a national drug code (NDC), a name of the medical product, or at least one substance included in the medical product.

9. The method of claim 1, wherein the adverse event term is a Medical Dictionary of Regulatory Activities (MedDRA) term.

10. The method of claim 1, further comprising:

determining, by the provider computing system, the case data is not duplicative, wherein the case dataset is generated in response to determining the case data is not duplicative.

11. A provider computing system for digitally interpreting a linguistic section of a source file to generate a case dataset, the provider computing system comprising:

a first repository for storing one or more case datasets;

a second repository for storing adverse event terms;

a network interface configured to facilitate data communication via a network; and a processing circuit comprising a processor and a memory, the processing circuit configured to:

receive, via the network interface, the source file including the linguistic section;

generate text data in a first language based on the linguistic section;

translate the text data from the first language to a second language;

select an adverse event term from the second repository;

determine a first portion of the text data includes the adverse event term;

output, via the network interface, the text data to a client computing device to enable display on a user interface comprising:

a document viewer section including the text data and a first comment including the adverse event term and a username associated with the provider computing system, wherein the first portion of the text data of the document viewer section includes a first indication; and a case data panel including an adverse event section, wherein the adverse event section includes an adverse event field including the adverse event term;

determine case data including the adverse event term;

generate the case dataset including the case data; and output, via the network interface, the case dataset.

12. The provider computing system of claim 11, wherein a second portion of the text data of the document viewer section includes a second indication in response to the document viewer section receiving a selection of the second portion, wherein the second portion of the text data includes a medical product identifier.

13. The provider computing system of claim 12, wherein the first indication is a highlight over the first portion of the text data in a first color, wherein the second indication is a highlight over the second portion of the text data in a second color, and wherein the first color does not match the second color.

14. The provider computing system of claim 12, wherein the medical product identifier is at least one of: a national drug code (NDC), a name of the medical product, or at least one substance included in the medical product.

15. The provider computing system of claim 12, wherein the document viewer section further includes a second comment including the medical product identifier and a username associated with a specific user in response to the document viewer section receiving a selection of the second portion.

16. The provider computing system of claim 15, wherein the case data panel further includes a details section, a country section, a patient section, a medical product section, and a reporter section.

17. The provider computing system of claim 16, wherein the processing circuit is further configured to:

determine the case data is complete by determining the case data includes at least one detail field, at least one country field, at least one patient field, at least one reporter field, the adverse event term, and the medical product identifier.

18. The provider computing system of claim 17, wherein the user interface further includes a validation section, and wherein the validation section provides an indication the case data is complete in response to determining the case data is complete.

19. The provider computing system of claim 11, wherein the adverse event term is a Medical Dictionary of Regulatory Activities (MedDRA) term.

20. The provider computing system of claim 11, wherein the processing circuit is further configured to:

determine the case data is not duplicative, wherein the case dataset is generated in response to determining the case data is not duplicative.

* * * * *